(12) United States Patent
Miranda Nieto (10) Patent No.: US 10,807,518 B2
(45) Date of Patent: Oct. 20, 2020

(54) TAILGATE ASSEMBLY WITH CARGO ZONE ILLUMINATION SYSTEM

(71) Applicant: FORD GLOBAL TECHNOLOGIES, LLC, Dearborn, MI (US)

(72) Inventor: Jorge Adolfo Miranda Nieto, Leon (MX)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 15/457,101

(22) Filed: Mar. 13, 2017

(65) Prior Publication Data
US 2018/0257545 A1    Sep. 13, 2018

(51) Int. Cl.
| | | |
|---|---|---|
| *B60Q 3/00* | (2017.01) | |
| *B60Q 1/30* | (2006.01) | |
| *B60Q 1/26* | (2006.01) | |
| *B60Q 1/44* | (2006.01) | |
| *H02J 7/00* | (2006.01) | |

(52) U.S. Cl.
CPC .......... *B60Q 1/307* (2013.01); *B60Q 1/2607* (2013.01); *B60Q 1/2615* (2013.01); *B60Q 1/302* (2013.01); *B60Q 1/44* (2013.01); *H02J 7/0045* (2013.01); *B60Q 2400/40* (2013.01)

(58) Field of Classification Search
CPC .... B60Q 1/307; B60Q 1/2607; B60Q 1/2615; B60Q 1/44; B60Q 2400/40; H02J 7/0045
See application file for complete search history.

(56) References Cited

U.S. PATENT DOCUMENTS

| | | | | |
|---|---|---|---|---|
| 4,679,026 | A * | 7/1987 | Knakowski | ......... B60R 11/0211 |
| | | | | 200/61.58 R |
| 6,863,482 | B2 * | 3/2005 | Lockhart | ................... B60P 3/40 |
| | | | | 410/97 |
| 7,834,750 | B1 | 11/2010 | Hertz et al. | |
| 8,552,852 | B1 * | 10/2013 | Hertz | ........................ B60P 3/40 |
| | | | | 340/468 |
| 9,205,774 | B2 | 12/2015 | Kennemer et al. | |
| 9,403,476 | B2 | 8/2016 | Hausler et al. | |
| 2005/0146888 | A1 | 7/2005 | Metcalf | |
| 2014/0198510 | A1* | 7/2014 | Law | ........................ B60Q 3/35 |
| | | | | 362/485 |
| 2014/0268775 | A1* | 9/2014 | Kennemer | .............. F21L 14/00 |
| | | | | 362/249.03 |

(Continued)

FOREIGN PATENT DOCUMENTS

| | | |
|---|---|---|
| EP | 0479652 A1 | 4/1992 |
| WO | 2006067460 A1 | 6/2006 |

OTHER PUBLICATIONS

English Machine Translation of EP0479652A1.

*Primary Examiner* — William J Carter
*Assistant Examiner* — Omar Rojas Cadima
(74) *Attorney, Agent, or Firm* — David Coppiellie; King & Schickli, PLLC (57) ABSTRACT

A tailgate assembly includes a tailgate body having a first receiver at a first lateral end and a second receiver at a second later end, a first light module held in the first receiver and a second light module held in the second receiver. The tailgate assembly may also include a third light module. The light modules illuminate a cargo area on the ground adjacent the tailgate and may be removed to a remote location if desired. A related illumination method is also provided.

9 Claims, 8 Drawing Sheets

(56) References Cited

U.S. PATENT DOCUMENTS

2014/0300463 A1\* 10/2014 Russ ................. B60Q 1/46
340/471
2016/0332563 A1   11/2016 Tseng
2018/0186281 A1\*  7/2018 Becker ............... B60Q 1/2615

\* cited by examiner

TAILGATE ASSEMBLY WITH CARGO ZONE ILLUMINATION SYSTEM

TECHNICAL FIELD

This document relates generally to the motor vehicle equipment field and, more particularly, to a tailgate assembly that incorporates an illumination system as well as to a method of illuminating a cargo zone comprising an area of ground adjacent the tailgate.

BACKGROUND

It is known in the art to equip a motor vehicle, such as a pickup truck, with a cargo lamp mounted near the top of the cab above the rear window. Such a cargo lamp provides useful lighting across the bed of the pickup truck to allow the operator to better see in low ambient light conditions. An example of such a cargo lamp is disclosed in, for example, U.S. Pat. No. 9,403,476 (Ford Global Technologies, LLC).

Significantly, the benefits of such a cargo lamp are somewhat limited as the cargo zone does not receive significant direct illumination. For purposes of this document, the cargo zone is defined as an area of ground around the tailgate which commonly includes the cargo to be loaded into the cargo bed of the pickup truck.

This document relates to a new and improved tailgate assembly incorporating an illumination system capable of providing useful lighting across this cargo zone. Further, the tailgate assembly incorporates removable lighting modules that may also be positioned at other remote locations to light any desired or designated area. Further, it should be appreciated that the lighting modules may even be utilized as a flashlight by the vehicle operator.

SUMMARY

In accordance with the purposes and benefits described herein, a new and improved tailgate assembly is provided with a novel illumination system. That tailgate assembly comprises a tailgate body including a first receiver at a first lateral end and a first light module held in the first receiver.

The first light module may include a first housing carrying a first light source, a first battery to power that first light source and a first terminal to charge the first battery. The first receiver may include a first charging connector mating with the first terminal when the first light module is held in the first receiver.

The tailgate assembly may further include a first releasable connection feature releasably securing the first light module to the first receiver. That first releasable connection feature may be a first magnet. The tailgate body may further include a second receiver at a second lateral end and a second light module may be held in that second receiver. That second light module may include a second housing carrying a second light source, a second battery to power the second light source and a second terminal to charge the second battery.

The second receiver may include a second charging connector mating with the second terminal when the second light module is held in the second receiver. A second releasable connection feature may be provided to releasably secure the second light module to the second receiver. That second releasable connection feature may be a second magnet.

Still further, the tailgate body may include a distal end and a third light module held in the distal end. That third light may incorporate bi-color white/red light emitting diodes. Such light emitting diodes may provide white light in one operating mode to light the cargo zone and red light in a second operating mode to function as a brake light when the motor vehicle is being operated on the roadway.

In accordance with an additional aspect, a method is provided of illuminating a cargo zone around a motor vehicle. That method comprises the steps of (1) providing a first light module at a first lateral end of a tailgate body and (2) providing a second light module at a second lateral end of the tailgate body. Together, the first light module and the second light module illuminate a cargo zone across an area of ground adjacent the first lateral end and second lateral end of the tailgate body.

The method may further include the step of providing a third light module at a distal end of the tailgate body between the first light module and the second light module. This third light module may provide illumination to the cargo zone across an area of ground adjacent the distal end of the tailgate body.

The method may further include the step of providing the first light module with a first light source and a first battery to power the first light source. Further, the method may include connecting the first light module to the first lateral end by a first releasable connection feature. In addition, the method may include charging the first battery when the light module is connected to the first lateral end of the tailgate body.

Still further, the method may include the steps of releasing the first releasable connection feature, removing the first light module from the first lateral end of the tailgate body and positioning the first light module at a remote location to light a designated area as desired by the user. Toward this end, the method may include the step of holding the first light module at the remote location with a magnet carried on the first light module.

In accordance with additional aspects, the method may include incorporating bi-color white/red light emitting diodes into the third light module and operating the third light module as a brake light when the motor vehicle is being operated on the roadway. In addition, the method may include the step of concealing the first light module and the second light module from view when the tailgate body is closed. Locking the tailgate in the closed position effectively prevents theft of the first and second light modules.

In the following description, there are shown and described several preferred embodiments of the tailgate assembly as well as the method of illuminating a cargo zone around a motor vehicle. As it should be realized, the tailgate assembly and method are capable of other, different embodiments and their several details are capable of modification in various, obvious aspects all without departing from the tailgate assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the tailgate assembly and the related method and together with the description serve to explain certain principles thereof.

Reference will now be made in detail to the present preferred embodiments of the tailgate assembly and method, examples of which are illustrated in the accompanying drawing figures.

DETAILED DESCRIPTION

Figure 1:
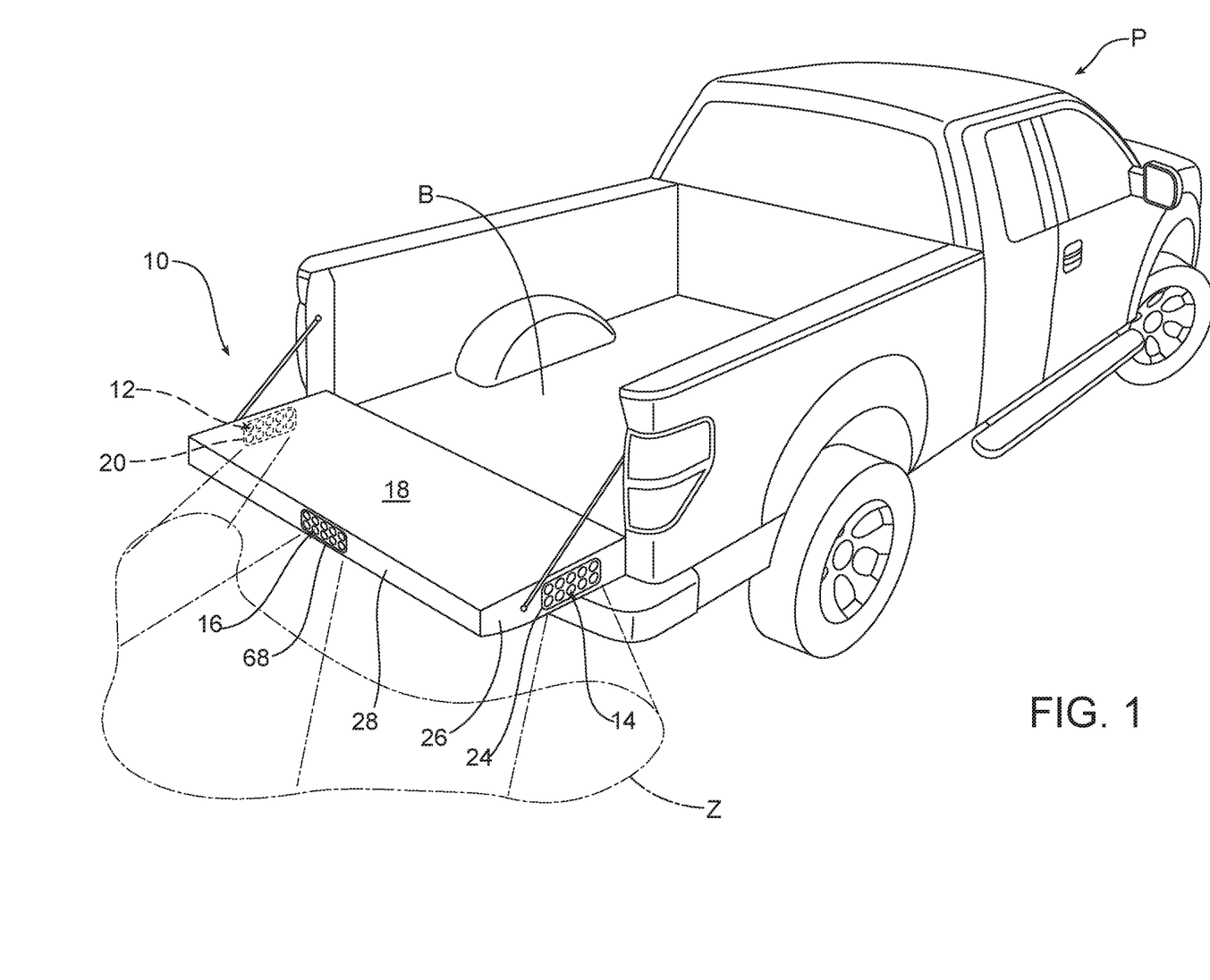
FIG. 1 is a perspective view of the rear of a pickup truck equipped with the tailgate assembly and illustrating the illumination provided to the cargo zone covering an area of ground adjacent to the two lateral ends and the distal end of the tailgate.
Figure 2:
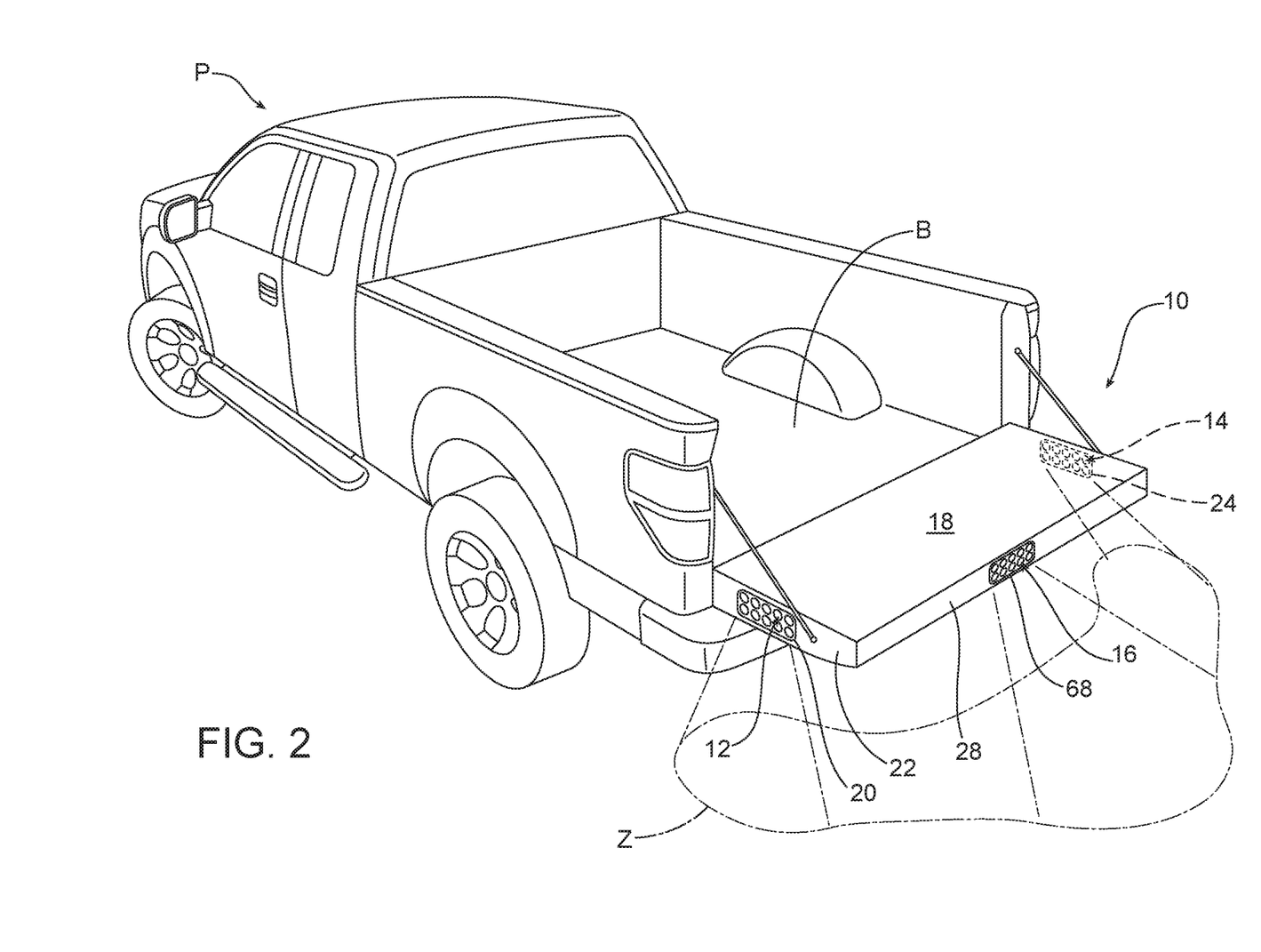
FIG. 2 is a rear perspective view of the pickup truck illustrated in FIG. 1 from the opposite rear corner to that illustrated in FIG. 1.

Reference is now made to FIGS. 1 and 2 illustrating a pickup truck P equipped with the new and improved tailgate assembly 10 incorporating a unique lighting system including a first light module 12, a second light module 14 and a third light module 16. As illustrated, the tailgate assembly 10 includes a tailgate body 18 having a first receiver 20 at a first lateral end 22 and a second receiver 24 at a second lateral end 26.

The first light module 12 is releasably received and held in the first receiver 20 at the first lateral end 22 of the tailgate body 18. The second light module 14 is releasably received and held in the second receiver 24 at the second lateral end 26 of the tailgate body 18. The third light module 16 is permanently mounted in the distal edge or end 28 of the tailgate body 18 so that it is positioned between the first light module 12 and second light module 14 and oriented rearward and downward when the tailgate is in the lowered position illustrated in FIGS. 1 and 2.

When the first light module 12, the second light module 14 and the third light module 16 are all carried on the tailgate body 18 and activated, these three light modules function to illuminate a cargo zone Z defined as an area of ground adjacent the first lateral end 22, the second lateral end 26 and the distal end 28 of the tailgate body 18. Such a cargo zone Z commonly includes cargo to be loaded into the cargo bed B of the pickup truck P.

Figure 3:
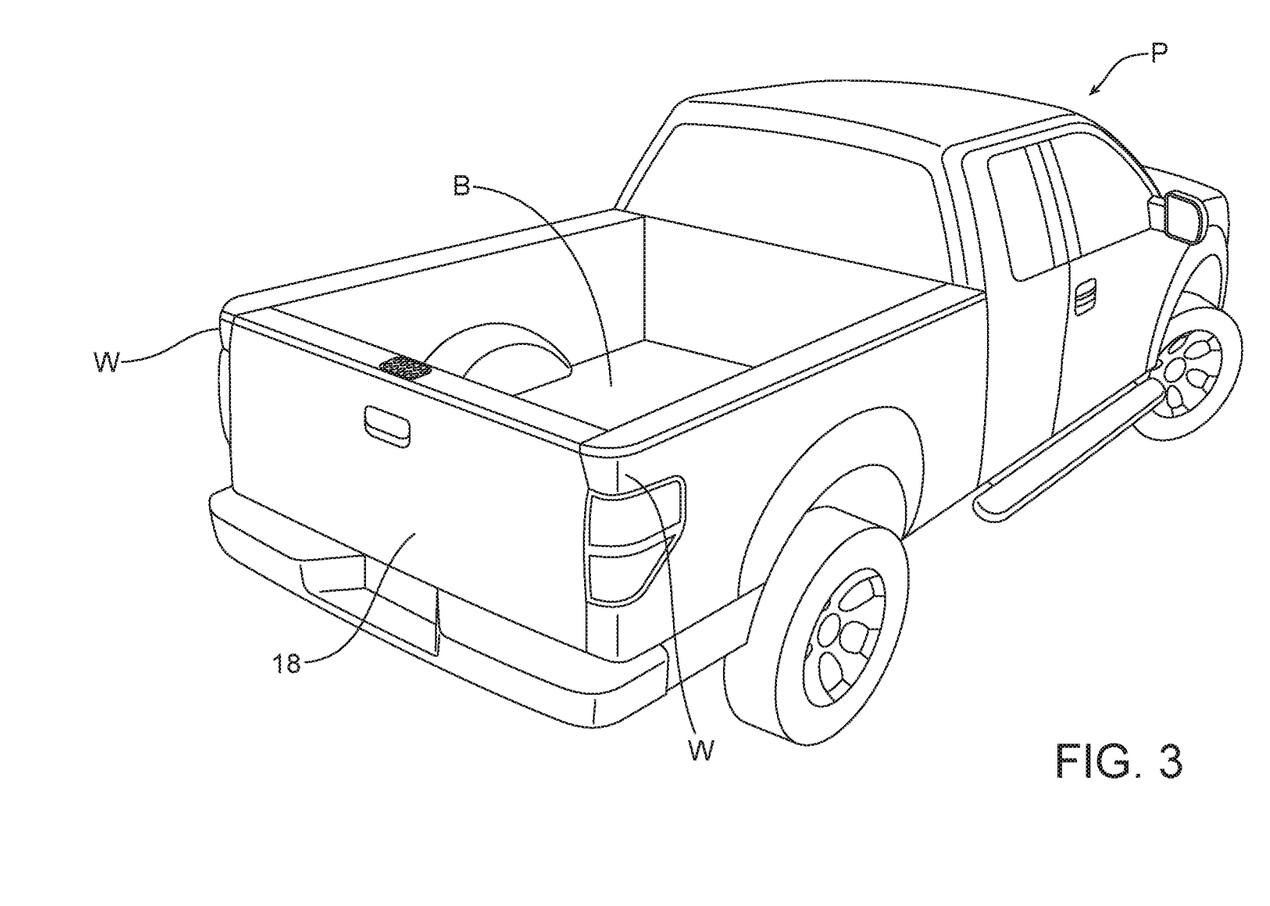
FIG. 3 is a rear perspective view of the pickup truck with the tailgate body in the raised and closed position showing how the light modules at the lateral ends of the tailgate are concealed from view when the tailgate body is in this position.

As should be appreciated from viewing FIG. 3, when the tailgate body 18 is raised into the closed position, the first light module 12 in the first receiver 20 at the first lateral end 22 and the second light module 14 in the second receiver 24 at the second lateral end 26 are concealed from view by the tailgate body and the sidewalls W of the cargo bed B (compare to FIGS. 1 and 2). Accordingly, locking the tailgate body 18 in the closed position secures the removable first light module 12 and removable second light module 14 against theft.

Figure 5A:
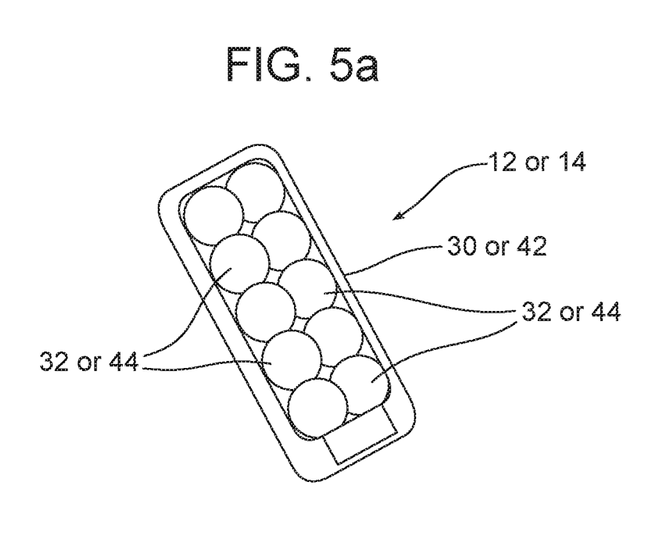
FIGS. 5a and 5b are detailed perspective views of the front and rear of the first light module.
Figure 5B:
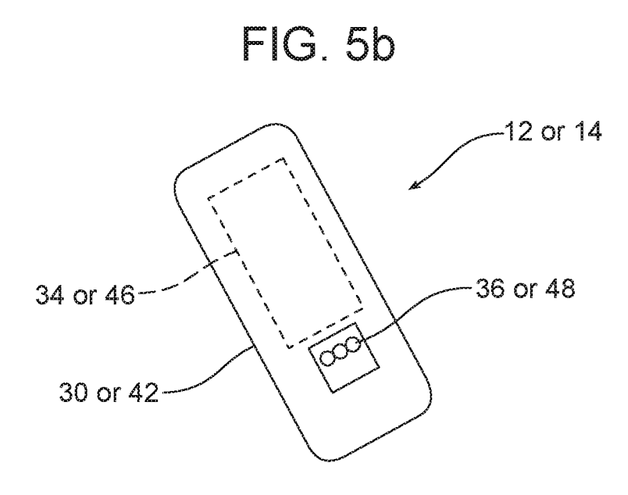

Reference is now made to FIGS. 5a and 5b which illustrate the first light module 12 in detail. As shown, the first light module 12 includes a first housing 30 carrying a first light source 32, a first battery 34 to power the first light source and a first terminal 36 to charge the first battery.

Figure 6:
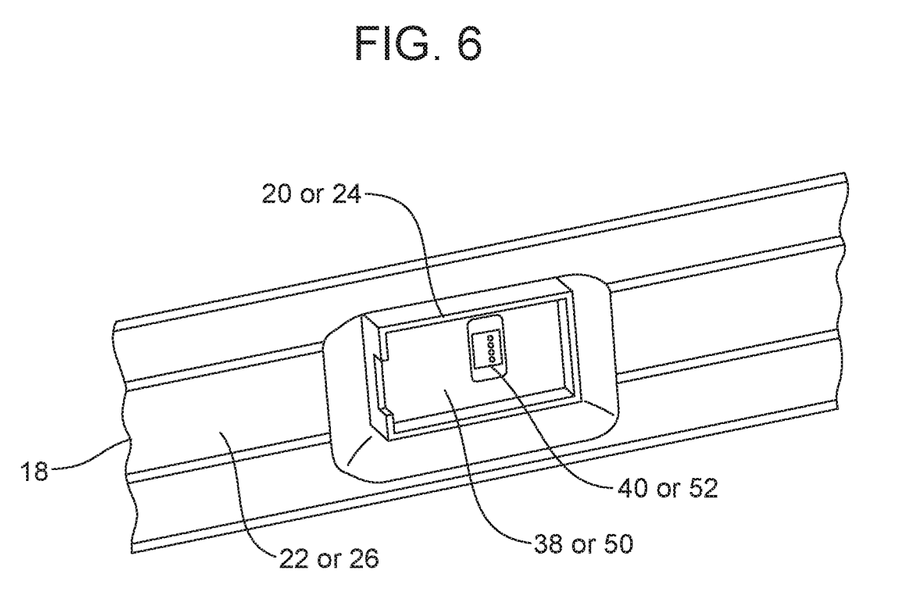
FIG. 6 is a detailed perspective view of the first receiver that receives and holds the first light module at the first lateral end of the tailgate body.

As illustrated in FIG. 6, the first receiver 20 includes a cavity 38 to receive and hold the first light module 12. A first charging connector 40 is provided in that cavity 38. When the first light module 12 is properly seated in the first cavity 38 of the first receiver 20, the first terminal 36 mates with the first charging connector 40 so that the electrical system of the pickup truck P may maintain the first battery 34 at full charge.

The second light module 14 may be identical to the first light module 12. Thus, as also illustrated in FIGS. 5a and 5b, the second light module 14 includes a second housing 42 carrying a second light source 44, a second battery 46 to power the second light source and a second terminal 48 to charge the second battery.

As illustrated in FIG. 6, the second receiver 24 includes a second cavity 50 and a second charging connector 52 in the second cavity 50. When the second light module 14 is properly seated in the second cavity 50 of the second receiver 24, the second terminal 48 is connected to the second charging connector 52 allowing the electrical system of the pickup truck P to maintain the second battery 46 in a full charge state.

Figure 4:
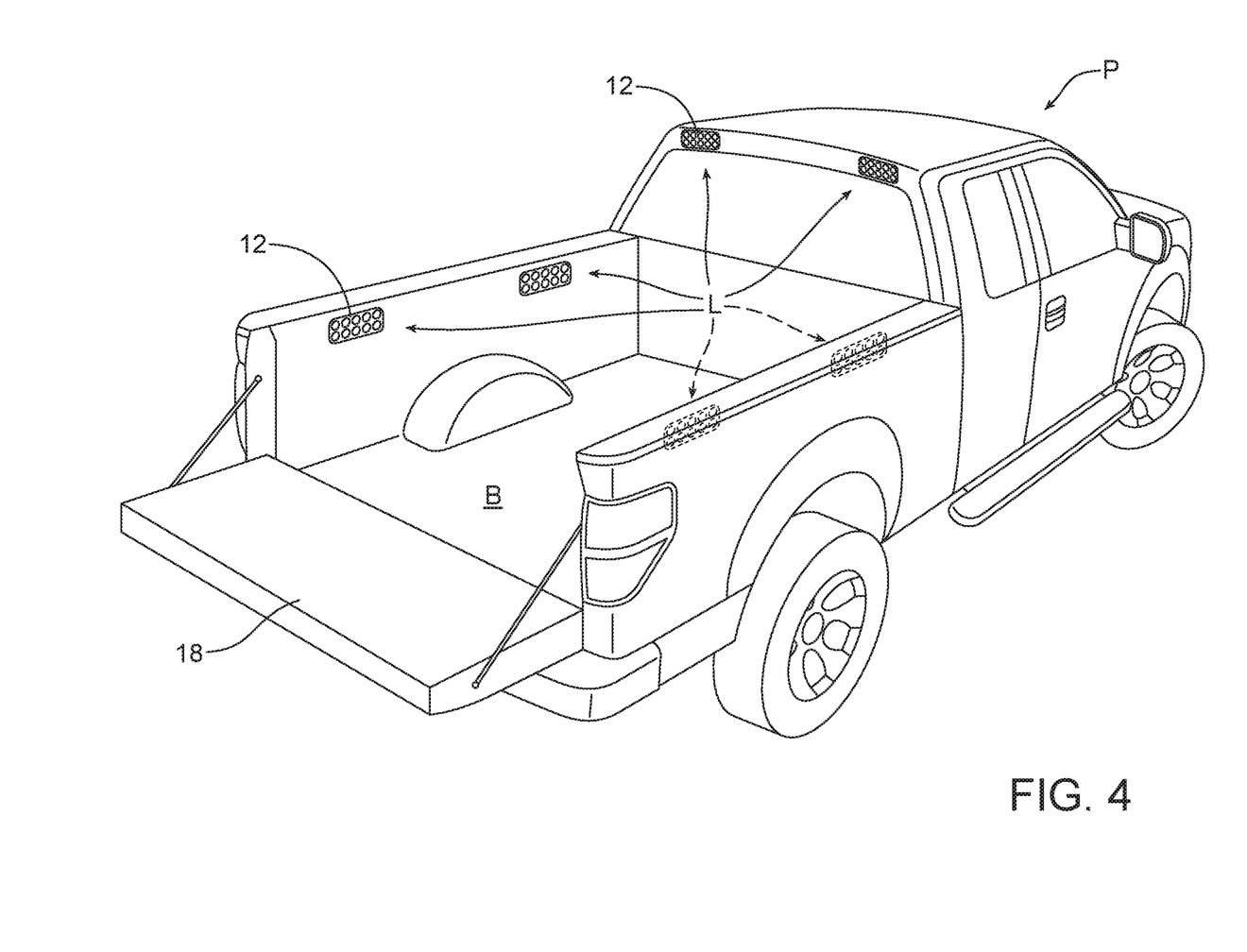
FIG. 4 is a perspective view illustrating some of the various remote locations at which one of the removable light modules may be positioned in order to light a desired or designated area around the motor vehicle.
Figure 7A:
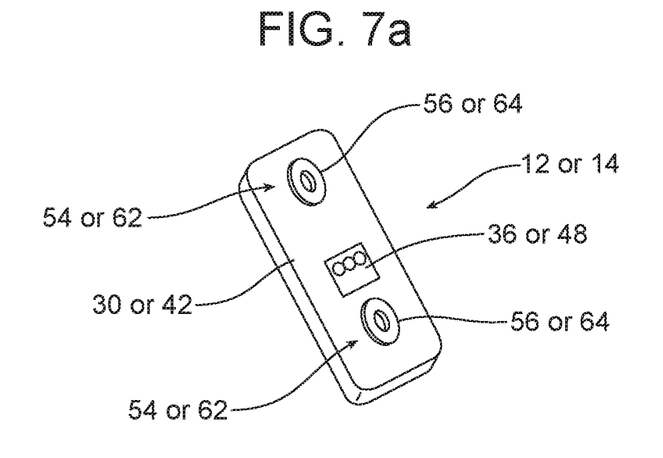
FIGS. 7a and 7b are respective detailed views of the rear face of the second light module and the second receiver illustrating one possible embodiment of the second connection feature.
Figure 7B:
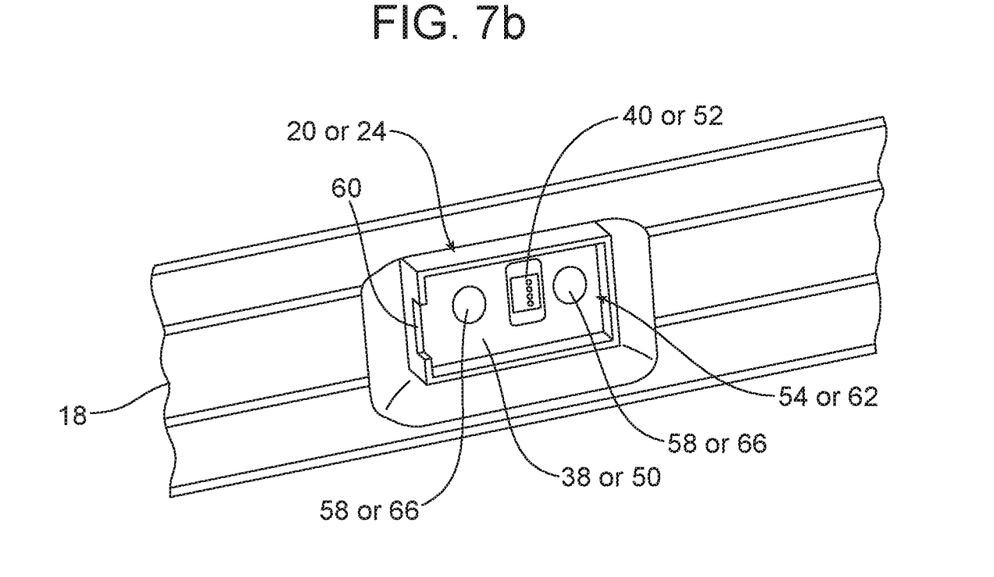

Reference is now made to FIGS. 7a and 7b illustrating one possible embodiment of a first releasable connection feature 54 for releasably connecting the first light module 12 to the first receiver 20. In this embodiment, the first releasable connection feature 54 comprises two magnets 56 carried on the rear of the first housing 30 and two cooperating ferromagnetic plates 58 provided in the first cavity 38 of the first receiver 20. When the first light module 12 is properly seated in the first receiver 20, the two magnets 56 contact the two ferromagnetic plates 58 and the magnetic field tends to hold the first light module 12 in position in the first receiver 20. However, when one wishes one may engage the first housing 30 with one or more fingers at the notch 60 in the wall of the first receiver 20 and break the magnetic field between the magnets 56 and the ferromagnetic plates 58, removing the first light module 12 from the first receiver 20. As illustrated in FIG. 4, that first module 12 may then be positioned at any number of remote locations L located all over the pickup truck P.

Where the pickup truck P includes a ferromagnetic body, the two magnets 56 on the first housing 30 of the first light module 12 will function to hold the first light module 12 at the remote location L to light a desired designated area such as, for example, the cargo bed B. Of course, it should be appreciated that the first light module 12 may also be positioned at other locations away from the pickup truck P or even carried as a flashlight by an individual if desired. The battery 34 provides the power to illuminate the light source 32 when the light module 12 is removed from the receiver 20.

As previously noted, the second light module 14 may be identical to the first light module 12. Thus, as also illustrated in FIGS. 7a and 7b, the second light module 14 may also include a second releasable connection feature 62 comprising two magnets 64 carried on the second housing 42 and two cooperating ferromagnetic plates 66 provided in the second cavity 50 of the second receiver 24. As should be appreciated, the second light module 14 may be removed from the second receiver 24 in the same manner as described above for the first light module 12 and the first receiver 20, thereby allowing the second light module to also be positioned at any remote location L as desired.

The first light source 32 and the second light source 44 may comprise substantially any light source known in the art. In the illustrated embodiment, the first light source 32 and the second light source 44 both comprise a plurality of white light emitting diodes (LEDs). In contrast, the third light source 68 of the third light module 16 at the distal end 28 of the tailgate body 18 may comprise a plurality of bi-color red/white LEDs. The third light source 68 may be configured by an appropriate controller (not shown) to operate in two different modes. When the pickup truck P is being operated on a roadway, the third light source 68 may operate in a stop light mode and the third light source 68 may illuminate in red when the brake is applied by the driver of the pickup truck P. In contrast, when the pickup truck P is stationary and the third light module 16 is being operated in cargo loading mode, the third light source 68 will be illuminated to provide white light to illuminate the cargo zone Z.

Consistent with the above description, a method is provided of illuminating a cargo zone Z around a motor vehicle such as the pickup truck P. That method may be broadly described as comprising the steps of: (a) providing the first light module 12 at the first lateral end 22 of the tailgate body 18 and (b) providing the second light module 14 at the second lateral end 26 of the tailgate body 18. Together, the first light module 12 and second light module 14 function to illuminate the cargo zone Z comprising an area of ground adjacent to the first lateral end 22 and second lateral end 26 of the tailgate body 18.

The method may further include the step of providing the third light module 16 at the distal end 28 of the tailgate body 18 between the first light module 12 and the second light module 14. This third light module 16 further illuminates the cargo zone Z including the area of ground adjacent the distal end 28 of the tailgate body 18.

The method may further include providing the first light module 12 with the first light source 32 and the first battery 34 to power the first light source. In this way the first light module 12 is self-powered and self-contained so that it may be removed to illuminate remote areas as described above and illustrated, for example, in FIG. 4.

Still further, the method may include the step of connecting the first light module 12 to the first lateral end 22 of the tailgate body 18 by a first releasable connection feature 54. Still further, the method may include releasing the first releasable connection feature 54, removing the first light module 12 from the first lateral end 22 of the tailgate body 18 and positioning the first light module 12 at a remote location L to light a designated area such as the cargo bed B illustrated in FIG. 4. Still further the method may include holding the first light module 12 at the remote location L with a magnet or magnets 56 carried on the first housing 30 of the first light module. In addition, the method may include the step of charging the first battery 34 when the first light module 12 is connected to the first receiver 20 at the first lateral end 22 of the tailgate body 18.

The method may also include the step of incorporating bi-color white/red light emitting diodes (third light source 68) into the third light module 16 and operating the third light module as a brake light when the pickup truck P is being operated on the roadway.

Still further, as illustrated in FIG. 3, the method may also include the step of concealing the first light module 12 and the second light module 14 from view when the tailgate body 18 is raised and closed. By locking the tailgate body 18 in the closed position, the removable first light module 12 and removable second light module 14 are secured against theft when the pickup truck P is left unattended. However, the first light module 12 and second light module 14 remain readily accessible to the vehicle operator when the tailgate body 18 is unlocked and lowered.

The foregoing has been presented for purposes of illustration and description. It is not intended to be exhaustive or to limit the embodiments to the precise form disclosed. Obvious modifications and variations are possible in light of the above teachings. For example, the third light module 16 could be made to be removable like the first light module 12 and the second light module 14. The third light module 16 could also be configured to operate as a fog light or with a strobe function if mounted to an emergency vehicle.

Figure 8A:
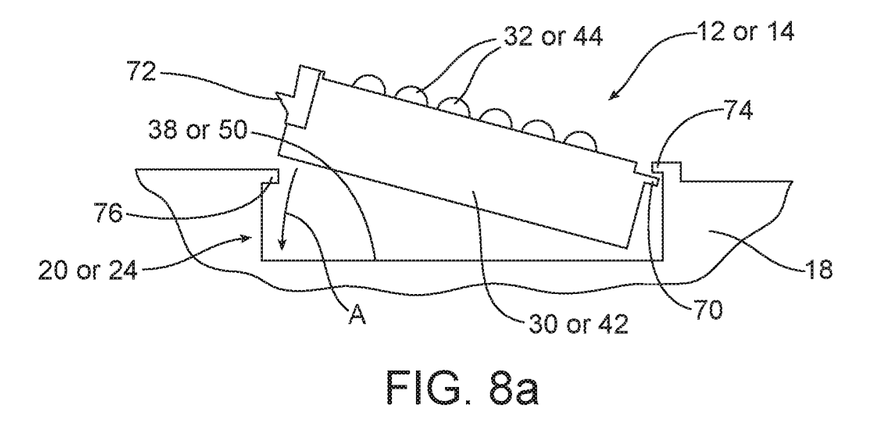
FIGS. 8a-8c are a series of schematic views illustrating another possible embodiment of the first light module, first receiver and first releasable connection feature.
Figure 8B:
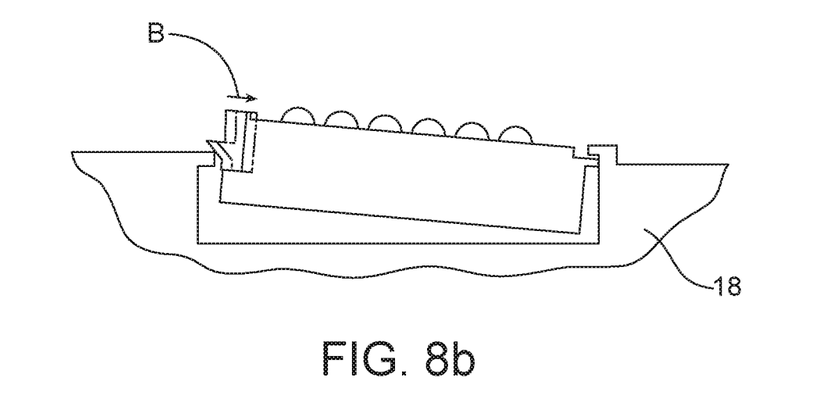
Figure 8C:
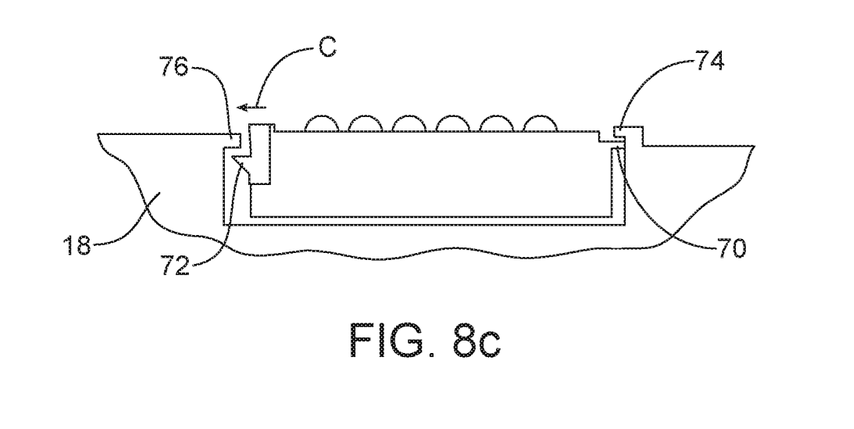

Still further, the first releasable connection feature 54 and/or the second releasable connection feature 62 may comprise a cooperating tab 70 and resilient hook 72 carried on the first or second housing 30/42 of the first or second light module 12/14 (see FIGS. 8a-8c). As illustrated in FIG. 8a, one would install the first or second light module 12/14 by inserting the tab 70 under the lip 74 of the first or second receiver 20/24. The resilient hook end of the first or second housing 30/42 is then pivoted down into the first or second cavity 38/50 as illustrated by action arrow A until the resilient hook 72 engages the shoulder 76. When this occurs the resilient hook 72 is displaced in the direction of action arrow B into the phantom line position allowing the first or second light module 12/14 to be fully seated within the first or second cavity 38/50 of the first or second receiver 20/24 as illustrated in FIG. 8c. The resilient hook 72 then returns back to the original or home position (note action arrow C) with the hook extending under the shoulder 76.

As should be appreciated, the tab 70 under the lip 74 and the hook 72 under the shoulder 76 function to retain the first or second light module 12/14 in the first or second receiver 20/24. When one wishes to remove the first or second light module 12/14 from the first or second receiver 20/24, one displaces the resilient hook 72 in a direction opposite to action arrow C until the resilient hook is again in the phantom line position illustrated in FIG. 8b allowing the clearance to remove the hook end of the light module from the cavity 38 or 50. The tab end of the light module 12 or 14 is then removed, freeing the light module for use at a remote location.

All such modifications and variations are within the scope of the appended claims when interpreted in accordance with the breadth to which they are fairly, legally and equitably entitled.

What is claimed:

1. A tailgate assembly in a vehicle having a cargo bed with sidewalls, comprising:
a tailgate body including a first receiver having a recessed cavity at a first lateral end;
a first light module held in said recessed cavity such that the first light module is substantially flush with the first lateral end; and
a first releasable connection feature releasably securing said first light module to said first receiver, wherein the first releasable connection feature is a first magnet wherein said first light module is (a) concealed from view by being positioned between said tailgate body and said sidewalls of said cargo bed when said tailgate body is in a closed position and (b) secured against theft when said tailgate body is locked in said closed position.

2. The tailgate assembly of claim 1, wherein said first light module includes a first housing carrying a first light source, a first battery to power said first light source and a first terminal to charge said first battery.

3. The tailgate assembly of claim 2, wherein said first receiver includes a first charging connector mating with said first terminal when said first light module is held in said first receiver.

4. The tailgate assembly of claim 3, wherein said tailgate body includes a second receiver at a second lateral end and a second light module is held in said second receiver wherein said second light module is (a) concealed from view by being positioned between said tailgate body and said sidewalls of said cargo bed when said tailgate body is in the closed position and (b) secured against theft when said tailgate body is locked in said closed position.

5. The tailgate assembly of claim 4, wherein said second light module includes a second housing carrying a second light source, a second battery to power said second light source and a second terminal to charge said second battery.

6. The tailgate assembly of claim 5, wherein said second receiver includes a second charging connector mating with said second terminal when said second light module is held in said second receiver.

7. The tailgate assembly of claim 6, further including a second releasable connection feature releasably securing said second light module to said second receiver.

8. The tailgate assembly of claim 7, wherein said second releasable connection feature is a second magnet.

9. The tailgate assembly of claim 6, wherein said tailgate body includes a distal end and a third light module is held on said distal end positioned between the first light module and the second light module and oriented rearward and downward when said tailgate body is in an open position.

* * * * *